(No Model.)
A. J. BECKER.
HAND ROCK DRILL.
No. 371,297. Patented Oct. 11, 1887.
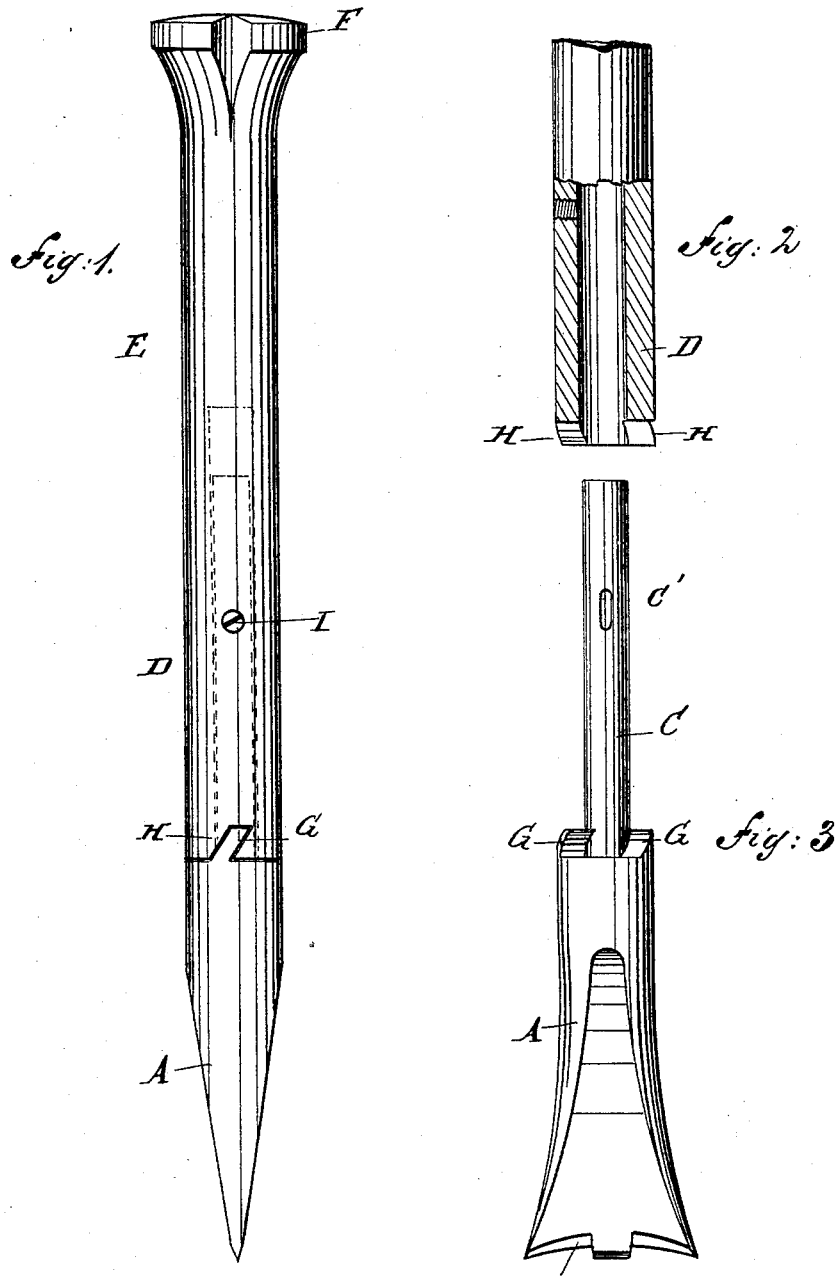
WITNESSES:
INVENTOR:
BY
ATTORNEYS.

UNITED STATES PATENT OFFICE.

AUGUST J. BECKER, OF MOUNT CARMEL, PENNSYLVANIA.

HAND ROCK-DRILL.

SPECIFICATION forming part of Letters Patent No. 371,297, dated October 11, 1887.

Application filed May 26, 1887. Serial No. 239,417. (No model.)

*To all whom it may concern:*

Be it known that I, AUGUST J. BECKER, of Mount Carmel, in the county of Northumberland and State of Pennsylvania, have invented a new and Improved Hand Rock-Drill, of which the following is a full, clear, and exact description.

The object of my invention is to provide a new and improved hand-drill for miners' use and carrying a removable cutting tool to facilitate grinding.

The invention consists of a cutting-tool provided with a shank fitting into the hollow shank of the holder, and of an annular lug or lugs formed on the cutting-tool and fitting into corresponding recesses on the lower end of the shank of the holder.

The invention also consists of certain parts and details and combinations of the same, as will be fully described hereinafter, and then pointed out in the claims.

Reference is to be had to the accompanying drawings, forming a part of this specification, in which similar letters of reference indicate corresponding parts in all the figures.

Figure 1 is a side elevation of my improvement. Fig. 2 is a sectional view of the lower part of the shank of the holder, and Fig. 3 is a front elevation of the cutting-tool.

My improved hand-drill is provided with the cutting-tool A, of the usual shape and form, and provided on its lower end with the usual cutting-edge, B. From the upper end of the cutting-tool A extends the reduced shank C, which fits into the hollow lower part of the shank D of the holder E, provided on its upper end with the usual head, F, for the purpose of tamping the hole.

On the upper end of the cutting-tool A are also formed one or more lugs, G, held in an inclined position and fitting in corresponding recesses, H, formed on the lower end of the shank D of the holder E. A set-screw, I, screws in the shank B and its inner end fits in a vertical groove, C', formed in the shank C of the cutting-tool A. When the latter is in place in the holder E, its shank C fits into the hollow shank D of the holder E, and the inclined lugs G fit into the similarly-shaped recesses H in the lower end of the shank D. The set-screw I is then screwed on the shank C until its pointed end fits into part of the vertical groove C', thus preventing the cutting-tool A from being removed from the holder E.

It will be seen that the cutting-tool A is prevented from turning in the holder E by the lugs G when the miner turns the hand-drill in drilling the hole in the usual manner.

The cutting-tool can be easily removed from the holder for grinding or other purposes and then replaced.

Having thus fully described my invention, I claim as new and desire to secure by Letters Patent—

1. In a hand-drill, the combination, with a hollow holder provided with recess on its lower end, of a cutting-tool provided with a shank secured in the hollow holder and with lugs fitting in the recesses of the said holder, substantially as herein shown and described.

2. In a hand-drill, the combination, with a holder, of a cutting tool provided with a shank fitting into the hollow part of the shank of said holder, and inclined lugs formed on the upper end of the cutting-tool and fitting into corresponding recesses in the lower end of the shank of the holder, and a set-screw screwing in the shank of the holder and against the shank of the cutting-tool, substantially as shown and described.

AUGUST J. BECKER.

Witnesses:
GIDEON WEITSEL,
GEORGE KLINGER.